United States Patent [19]

Cidon et al.

[11] Patent Number: 5,684,961
[45] Date of Patent: Nov. 4, 1997

[54] SYSTEM FOR DEFINING MULTICAST MESSAGE DISTRIBUTION PATHS HAVING OVERLAPPING VIRTUAL CONNECTIONS IN ATM NETWORKS AND ASSIGNING IDENTICAL LABELS TO OVERLAPPING PORTIONS OF THE VIRTUAL CHANNELS

[75] Inventors: Israel Cidon, Palo Alto; Man-Tung Tony Hsiao, Fremont, both of Calif.; Raphael Rom, Haifa, Israel; Phanindra Jujjavarapu, Pleasanton, Calif.; Moshe Sidi, Haifa, Israel; Asad Khamisy, Sunnyvale, Calif.

[73] Assignee: Sun Microsystems, Inc., Mountain View, Calif.

[21] Appl. No.: 430,347

[22] Filed: Apr. 28, 1995

[51] Int. Cl.$^6$ .............................. G06F 13/00; H04L 12/46
[52] U.S. Cl. ......................... 395/200.15; 395/200.02; 395/311; 370/53; 370/60; 370/94.3; 370/85.14
[58] Field of Search ............... 395/200.15, 200.02, 395/311; 370/53, 54, 60, 94.3, 85.14

[56] References Cited

U.S. PATENT DOCUMENTS

| | | | |
|---|---|---|---|
| 5,079,767 | 1/1992 | Perlman | 370/94.3 |
| 5,289,460 | 2/1994 | Drake, Jr. et al. | 370/17 |
| 5,323,394 | 6/1994 | Perlman | 370/85.13 |
| 5,355,371 | 10/1994 | Auerbach et al. | 370/60 |
| 5,418,781 | 5/1995 | Kaufman et al. | 370/60 |
| 5,511,168 | 4/1996 | Perlman et al. | 395/200.15 |
| 5,572,522 | 11/1996 | Calamvokis et al. | 370/60.1 |

*Primary Examiner*—Christopher B. Shin
*Assistant Examiner*—Rehana Perveen Krick
*Attorney, Agent, or Firm*—Gary S. Williams; Flehr Hohbach Test Albritton & Herbert LLP

[57] ABSTRACT

In a communication network having a set of hosts and switch based label swapping communication nodes, each node has a control processor that is also a host that sends and receives messages via the switching apparatus in its associated node. At least one of the hosts includes a distribution tree set up procedure. That procedure stores source and destination data designating a set of source hosts and a set of destination hosts in the communication network, and defines a distribution tree of virtual connections. The designated source hosts and destination hosts may include the control processors of some or all the network nodes. The defined virtual connections include a virtual connection from each designated source host to all of the designated destination hosts, and message labels for all messages sent by the source hosts to be routed to the destination nodes. The virtual connections convey each message from the source hosts that have the defined message labels to all the designated destination hosts as a single multicast message. The message labels are defined so that overlapping portions of the virtual connections use the same message labels. All the nodes in the distribution tree are programmed by sending one or more virtual connection set up messages that instruct the nodes in the distribution tree on the label swapping data to be stored in each such node.

14 Claims, 8 Drawing Sheets

PRIOR ART

SYSTEM FOR DEFINING MULTICAST MESSAGE DISTRIBUTION PATHS HAVING OVERLAPPING VIRTUAL CONNECTIONS IN ATM NETWORKS AND ASSIGNING IDENTICAL LABELS TO OVERLAPPING PORTIONS OF THE VIRTUAL CHANNELS

The present invention relates generally to the class of computer communication networks known as switch based label swapping computer networks, the most prevalent example being Asynchronous Transfer Mode computer networks, and more specifically relates to a system and method for efficient multicast communication of messages to and from multiple sources and destinations.

BACKGROUND

Figure 1:
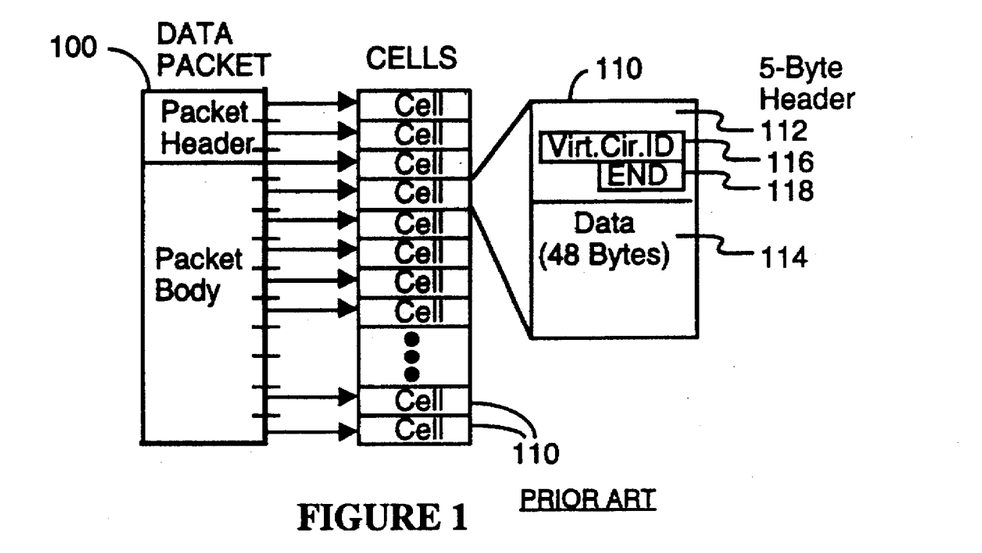
FIG. 1 is a block diagram of a data packet and the corresponding ATM cells into which the packet is fragmented for purposes of transmission over a network.

Modern high speed networks use a new set of standards collectively termed ATM (Asynchronous Transfer Mode). Referring to FIG. 1, in ATM computer networks data packets 100 transmitted over the network are fragmented into smaller cells 110 for transmission over the network. Each cell 110 is 53 bytes long, including a five-byte header 112 and a 48-byte cell payload (i.e., data) 114. Each cell's header 112 includes a "virtual connection identifier" 116, discussed below, and a END flag 118 that is set only for the last cell of each data packet. Data packets that are 48 bytes or less in length are transmitted as single cell (also called unicell) messages.

Figure 2:
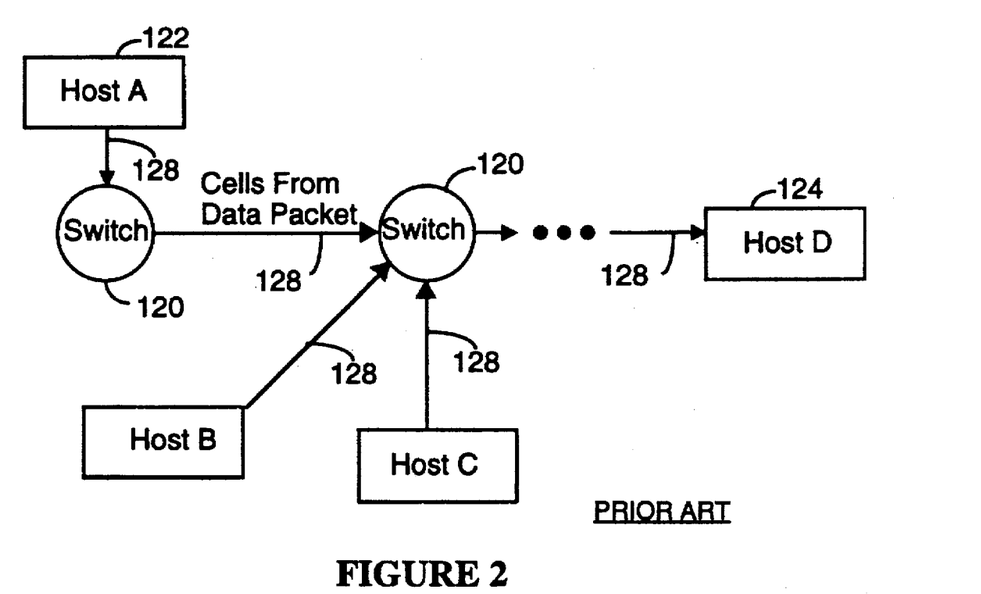
FIG. 2 is a block diagram of a portion of a computer network.

Furthermore, as shown in FIG. 2, the cells of a data packet may need to be routed through a number of switches 120 during transport from a sourcing host computer A 122 to a destination host computer 124.

To allow very high data rates (in the hundreds of Mb/s and above) the switching time of a cell in every switch 120 along the route must be minimal. ATM networks achieve this by means of a label swapping mechanism which requires a set up phase before the actual data stream can be transported from source to destination.

A major objective of the set-up phase is the computation of a "good" route between the required source and destination(s) of the data stream. To compute a good route the nodes must have updated information regarding the level of utilization of the individual links and other elements in the network. The problem addressed by the present invention is how to devise an efficient method for distributing the utilization information among all the network nodes.

To put the problem into perspective, a medium size network might serve hundreds of users each attempting to establish several connections per second. For a set of 100 users each establishing 10 connections per second with each connection (circuit) on the average 10 hops long would cause network wide 10,000 changes in resource utilization levels per second.

The current invention is aimed at facilitating the distribution of the utilization data so that the most updated information is available at the place it is needed while minimizing the burden of the dissemination process. The invention takes advantage of the way in which ATM switches are constructed.

Referring again to FIG. 2, at a high level, ATM networks can be viewed as a collection of ATM-switches 120 interconnected by high-speed links 128 in a networked fashion to provide ATM service to a number of external users 122, 124.

Figure 3:
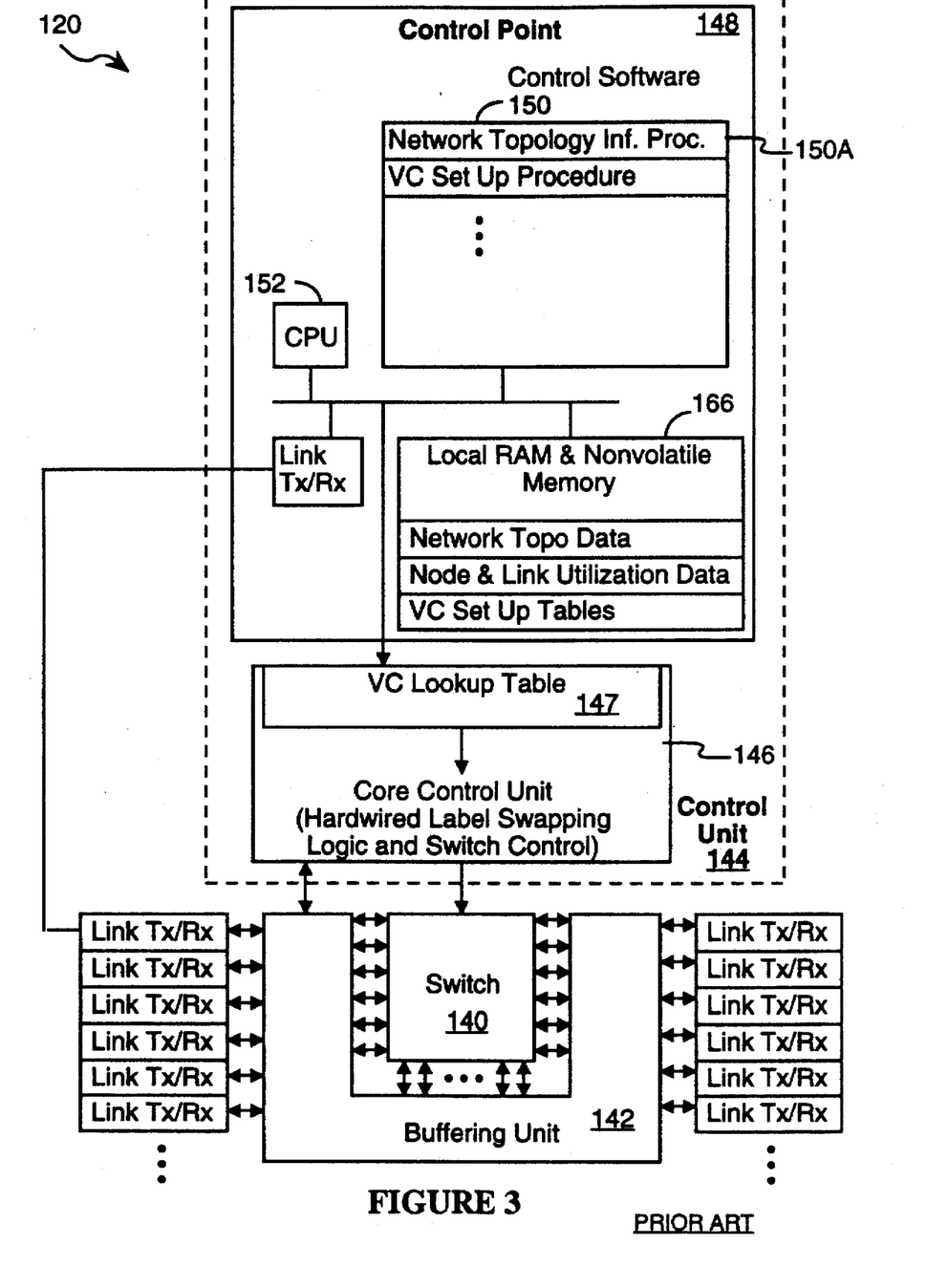
FIG. 3 is a block diagram of a node in an ATM network.

Referring to FIG. 3, a typical switch 120 is comprised of three main pads: the switching fabric 140, a buffering unit 142, and a control unit 144. The control unit 144 is divided into two pads 146, 148. The first pad 146 controls the cell switching properties, i.e., it controls and coordinates the operation of the buffering unit and the switching fabric. For performance reasons, the first pad 146 of the control unit is typically implemented in hardware such a VC lookup table 147, finite state machines, and so on. The second pad 148 of the control unit is responsible for all other control functions such as preparing and maintaining the switching tables, coordinating activities with other switches and with network management facilities, and serving individual user requests. We refer to this second pad of the control unit as the control point (CP) of the switch. In our terminology the switch contains the switching fabric, the buffering unit, and the basic core of the control unit, whereas the switch and the CP together will be referred to as an ATM node (or node, for shod). The CP 148 is essentially a logical entity which is typically implemented using control software 150 executing on a general purpose microprocessor 152, although firmware and other software/hardware configurations are also possible. A configuration in which a single CP controls several switches is also possible. For example, if the particular way in which a switch is implemented lends itself to the efficient interconnection of several switches (typically of the same kind) then it would be natural to have this set of switches controlled by a single CP.

The physical device on which the CP is implemented is termed the Controlling Device (CD). The CD may not be a single entity, since pads of the CP can be implemented in different hardware pieces. For example, each link adaptor of a switch could contain a separate micro-controller and possibly an additional central micro-processor could be responsible for the common switch functions. Another implementation option is a single CD that hosts several CPs, each controlling a different switch and possibly communications with each other within the same CD.

Two CPs are called neighbors if they control two switches 120 that are directly connected by a link 128. A CP is a uniquely identifiable entity within the network. That is, it is possible to name a CP as the endpoint of a virtual connection (VC) and switches can identify cells destined to the CP and forward them appropriately. This is the mechanism by which control messages can be exchanged between CPs.

It is noted that the terms connection, virtual connection and virtual circuit are used interchangeably in this document. More particularly, all three of these terms are defined to mean a communication channel that may include one or more interconnected virtual connection segments. Each virtual connection segment is a data channel or control channel that traverses one link between two neighboring nodes or one link between a host and node, while a virtual connection (VC) may traverse numerous links and their connecting nodes. A "connection" is established or represented by a set of one of more virtual connection indentifiers (VCIs) stored in the VC tables of the nodes along the connection path.

Every switch 120 in the network possesses a unique ID, which is assigned to it at configuration time. This ID, termed the switch/D, is guaranteed to be unique only within the network. Links 128 can have IDs that are local to the switch from which they emanate. This allows the use of short local link IDs, which is beneficial since local link IDs are frequently used. Therefore, to globally identify a link, some combination of a CP ID, node ID and link ID must be used. Link, switch and CP IDs appear in the messages that are exchanged between CPs and hence it is beneficial to choose as short a descriptor as possible.

In general, CPs perform those functions that are necessary to make a group of switches operate as an integrated network. The process of integration entails understanding of and compensation for the differences between switches of different makes and models. One of the most important functions is that of virtual connection (circuit) management which includes VC set-up, maintenance and VC take down. To perform these functions properly the CP must maintain information regarding network topology and its level of utilization (e.g., available bandwidth on various links with respect to every class of service). Each control point's control software includes a network topology information maintenance procedure 150A for the purposes of retaining up-to-date network topological information. Topological data typically changes very infrequently while utilization data, as explained above (and by design), changes very frequently.

To achieve their functions, CPs obviously need to communicate with one another either directly or indirectly. The Control mechanism typically requires CPs to mostly communicate with neighbor CPs. In many cases a message arriving at a CP may trigger the transmission of another message. For example, if a topological change has occurred in the network, a CP will typically notify other CPs (e.g., its neighbors) of the change; each of the recipients of this message may, in turn, generate new messages to further distribute the information. We define a control link as the channel over which two CPs communicate. The collection of control links must enable every CP to distribute the appropriate data to every other CP. In a typical design, there will be a control link between any two neighboring CPs.

Many network implementations use the control links for the dissemination of utilization information. This approach is extremely inefficient. As mentioned above this approach may result in having to handle tens or hundreds of thousands of messages per second in the CP.

A simpler and better approach makes use of multicast VCs that are supported by ATM switches. A multicast VC is a virtual connection with a single source and multiple destinations. Such VCs are typically organized in a tree structure (as opposed to the "shoe-string" structure of a regular VC). To implement a utilization update mechanism, every node could set up a multicast tree with itself as the source and all other nodes as destinations. Thus whenever a node determines that a change has occurred that warrants updating the other nodes it will construct an update message and send it along its multicast tree.

Unfortunately, this approach does not scale well. It requires setting up and maintaining as many trees as there are nodes in the network. Moreover, every such VC consumes an entry in every switch's VC table, meaning that in every switch one would have to set aside a large number of entries for this purpose. VC table entries are a limited, and expensive resource.

SUMMARY OF THE INVENTION

In summary, the present invention is a system and method for distributing data among the controllers of network nodes in a switch based label swapping network. The multicast capability of ATM networks is used for the efficient dissemination of such data. Each node has a control processor that sends and receives messages via the switching apparatus in its associated node. At least one of the control processors includes a distribution tree set up procedure. That procedure stores source and destination data designating a set of source hosts and a set of destination hosts in the communication network, and defines a distribution tree of virtual connections. The designated source hosts and destination hosts may include the control processors of some or all the network nodes.

The defined virtual connections include a virtual connection from each designated source host to all of the designated destination hosts, and message labels for all messages sent by the source hosts to be routed to the destination nodes. The virtual connections convey each message from the source hosts that have the defined message labels to all the designated destination hosts as a single multicast message. The message labels are defined so that overlapping portions of the virtual connections use the same message labels.

After defining the distribution tree, the distribution tree set up procedure programs all the nodes in the distribution tree by sending, via the network, one or more virtual connection set up messages that instruct the nodes on the label swapping data to be stored in each such node.

Each of source hosts includes a message transmission procedure and transmitter for transmitting messages, where each message when initially transmitted contains an initial one of the defined message labels. Each such message is transmitted to all the designated destination hosts as a single multicast transmission.

The distribution tree set up procedure in a first preferred embodiment selects at least one of the communication nodes as a pivot node, and defines for each source host a sequence of connected nodes and output links that couple the source host to one of the pivot nodes. Also defined are a corresponding sequence of input labels to be included in a message sent by the source host as the message is forwarded by the sequence of connected nodes to the pivot node. Each sequence of input labels includes an associated first input label to be stored in a message when it is initially transmitted by the corresponding source host.

Next, in the first preferred embodiment the distribution tree procedure defines for each pivot node a destination tree of nodes and output links that couple the pivot node to all of the destination hosts. Also defined are a corresponding set of input labels to be included in a message sent by the pivot node as the message is forwarded by the tree of connected nodes to all of the destination host. Further, output labels to be stored in messages sent to the destination hosts by the nodes in the destination tree that are directly connected to the destination hosts are assigned.

Finally, the switching apparatus in the nodes in each sequence of connected nodes and in each destination tree are programmed in accordance with the defined sequences and sets of input labels and output labels.

When messages are transmitted from the source hosts to all of the destination hosts, each message when initially transmitted by a source host contains the associated first input label.

The distribution tree set up procedure in a second preferred embodiment defines a tree of nodes and bidirectional links interconnecting all of the source hosts and destination hosts. It assigns a single input label for each communication node input link traversed by the tree and assigns a single output label for each communication node output link traversed by the tree.

Next, the distribution tree procedure programs the switching apparatus of each communication node in the defined tree to send each message received by the communication node on an input link, where the message includes the input label assigned to the receiving input link, to all of the output links of the receiving communication node to which an output label has been assigned except the output link to the node or host from which the message was received. As a result, a virtual connection for messages transmitted by each source host is defined such that any message transmitted via any of these virtual connections is routed along any link of the network no more than once, and overlapping portions of the virtual connections are assigned identical labels, minimizing the total number of labels required by the virtual connections.

The present invention sets up an efficient multicast distribution tree for distributing network utilization data to a designated set of destination nodes. Using the multicast distribution tree of the present invention in a network of n nodes, the number of virtual connection identifiers (VCIs) required in any node for the distribution tree cannot exceed n+1 and the total number of VCIs needed in all the nodes of the network cannot exceed 3 n−2. Thus, less than three VCIs per node are required for definition of the distribution tree, on the average.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

The present invention provides for the efficient dissemination of network utilization data (as well as other data) using the multicast capability of ATM networks, but does not suffer the scaling problem described earlier in this document. The present invention uses a construct which herein termed a distribution tree.

A distribution tree is a multicast construct with several sources and several destinations. The number and identity of the sources and destinations does not have to be identical. A cell sent by any of the sources on the distribution tree will arrive at all the designated destinations. The present invention is applicable to those switches which do not support such a capability directly but which support only a single-source unidirectional multicast.

Each link between neighboring nodes, or between a host and a node, includes communication channels going in both directions. From the perspective of any node, each such link includes an input link and an output link. Of course, the input link of a first node is the output link of another node or host, and the corresponding output link of the first node is the input link of that other node or host.

First Preferred Embodiment: Pivot Based Approach

Figure 4:
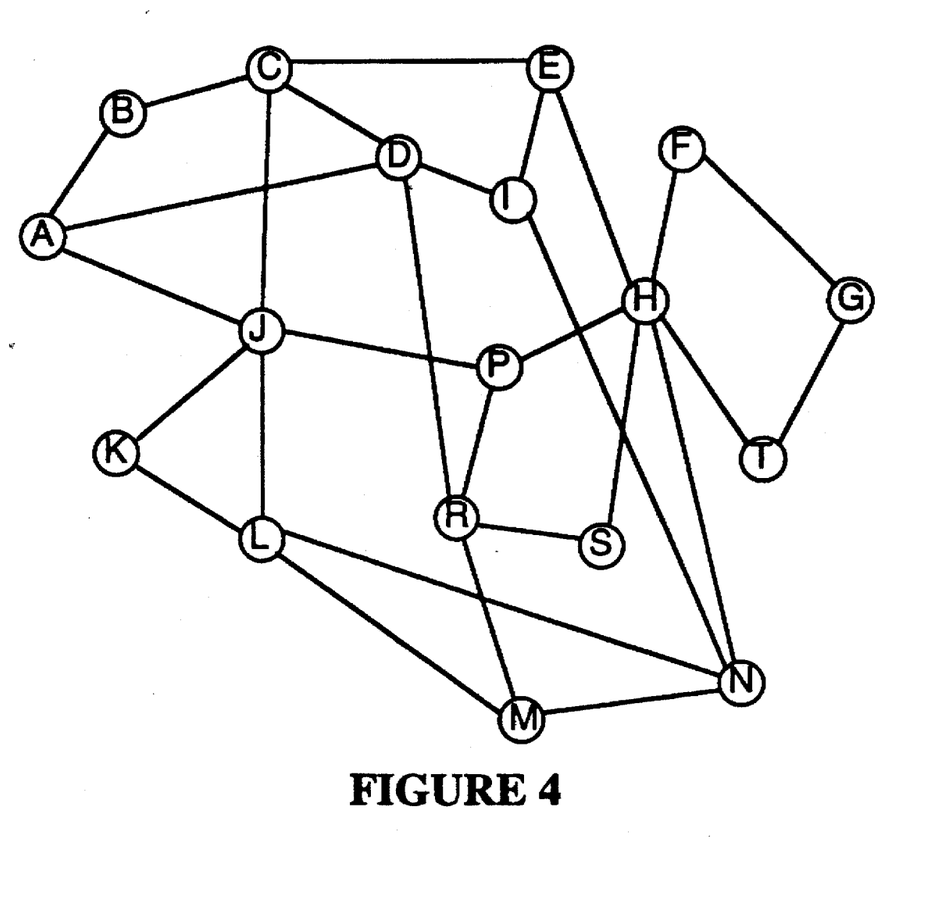
FIG. 4 depicts a set of nodes in an ATM network.

Referring to FIG. 4, in the first preferred embodiment, the distribution tree is generated as follows. A set of source hosts (sources) and a set of destination hosts (destinations) are designated, typically by an engineer or network administrator when configuring a communication network. In a preferred embodiment, a revised network topology information maintenance procedure 250A (see FIG. 5) in the each node's control processor 248 automatically designates the source and destination nodes each time a network topology change occurs. This designation is made in accordance with predefined selection criteria and configuration data stored in the control processor's local memory 266 when the node 220 is installed in a network. In many cases, the control processors of all nodes will be designated as both source hosts and destination hosts. In addition, host computers coupled to switch nodes, may be designated as either source or destination hosts, or both.

Figure 6:
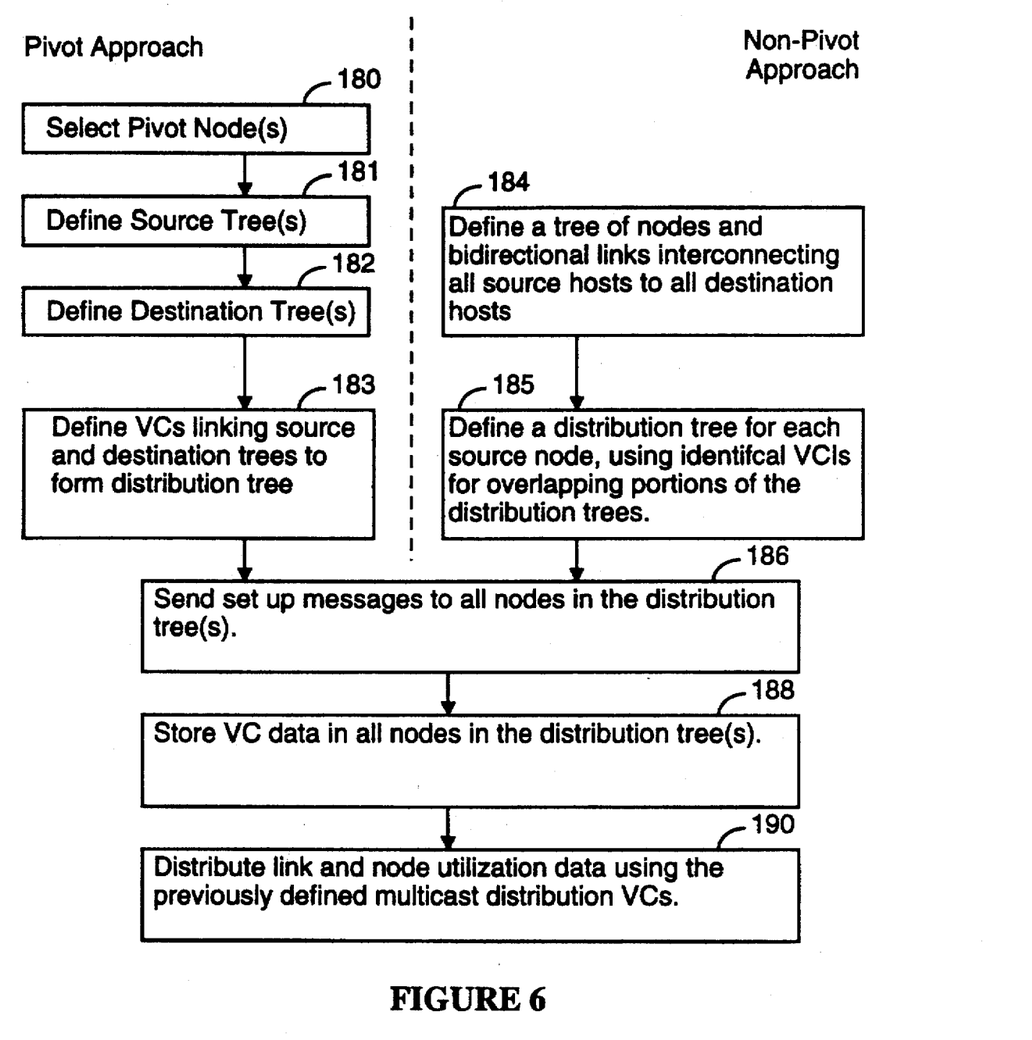
FIG. 6 depicts a flow chart of the preferred embodiment of the procedure for defining and setting up a distribution tree.
Figure 7:
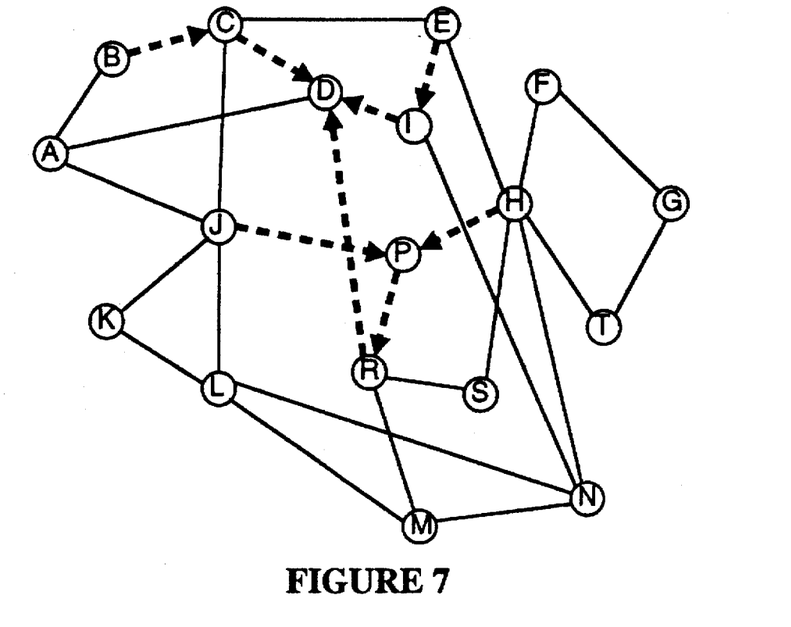
FIG. 7 depicts a source tree in an ATM network.
Figure 8:
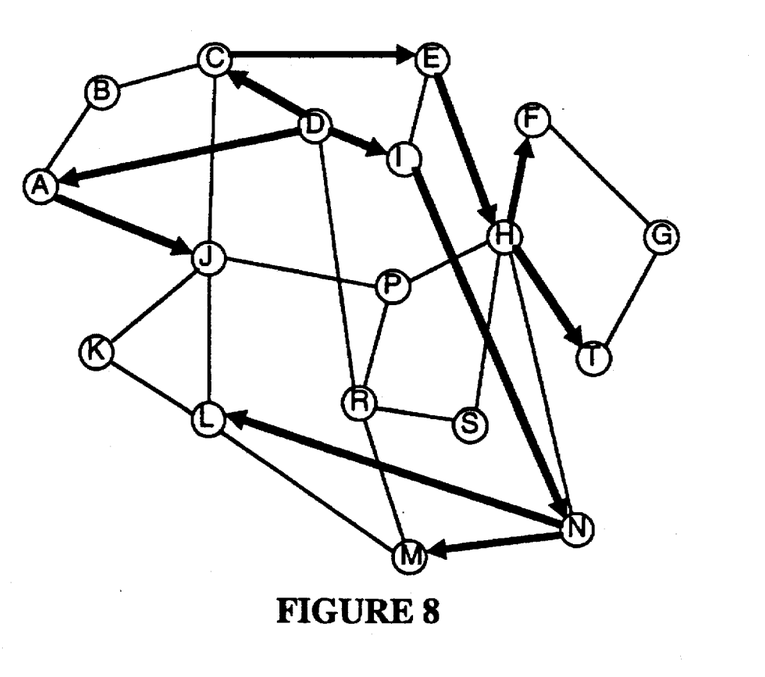
FIG. 8 depicts a destination tree in an ATM network.

In other situations, a first subset of the control processors may be designated as source hosts and a second distinct subset of the control processors may be designated as destination hosts. For example, in FIG. 4, the control processors of nodes B, E, H, J and R might be source hosts, and the control processors of nodes C, F, J, L, M and T might be destination nodes. Referring to FIGS. 4 and 6, a pivot switch (which can be any switch) is selected (180) and then two directed trees are constructed (181, 182): one consisting of the pivot switch along with a set of connected switches between the source hosts and the pivot switch (the "source" tree) and the other consisting of the pivot switch with a set of connected switches between the pivot switch and the destination hosts (the "destination tree"). The source tree is directed towards the pivot switch and the destination tree is directed away from the pivot switch. The construction of these two trees (i.e., the generation and storage of virtual connection Identifiers in the VC tables of the switches in the distribution tree) is done using the same techniques used for conventional VC construction. Tree construction is well known to those of ordinary skill in the art of designing ATM network controllers.

A cell entering at any of the switches carrying the VCI of the source tree will end up at the pivot switch. Then, using the multicast capability, every cell entering the pivot with the VC identifier of the destination tree will be switched and distributed to all destinations. By appropriately setting the VC-table at the pivot so that the source tree VCI and the destination tree VCI are linked together, the distribution tree is constructed (183).

Figure 9:
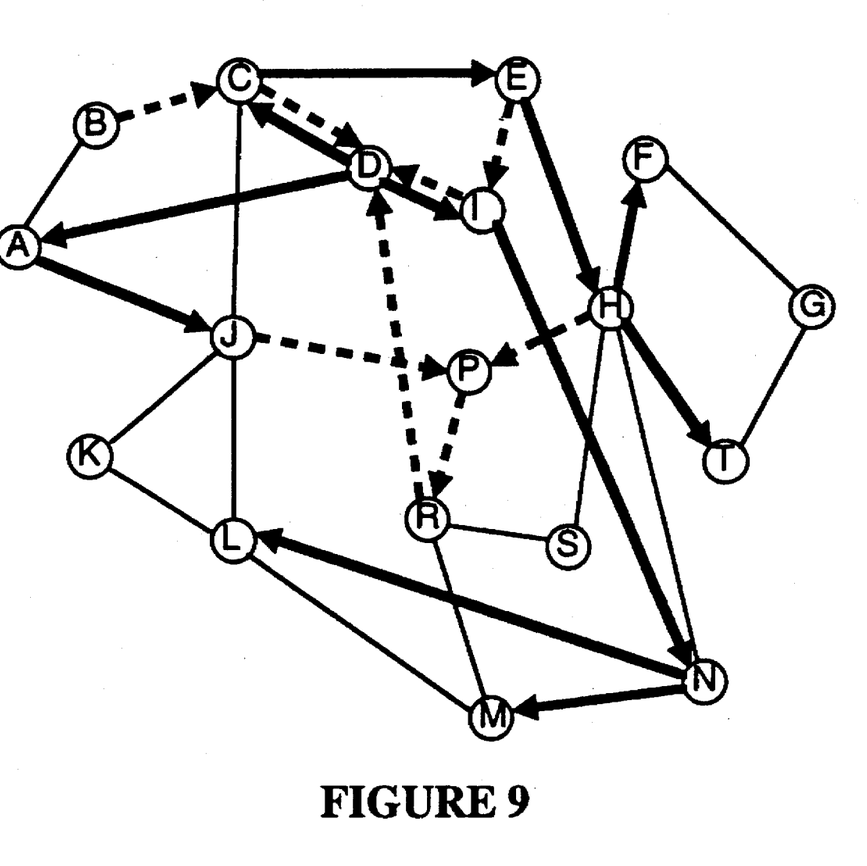
FIG. 9 depicts a distribution tree in an ATM network.

To be more concrete, FIGS. 4, 7, 8 and 9 show the construction a distribution tree in accordance with the present invention. Suppose it is required to build a distribution tree where the sources are the control processors of nodes {B, E, H, J, R} and the set of destinations are the control processors of nodes {C, F, J, L, M, T}. We choose node D as the pivot and construct a source tree as shown in bold dotted lines in FIG. 7. The source tree requires a single VCI (virtual connection identifier) in each of the switches included in the source tree. Any cell inserted at one of the source nodes (i.e., a node coupled to a source host) ends up at the pivot, D. Similarly, a destination (multicast) tree is constructed as shown in bold solid lines in FIG. 8. Again, a single VCI per node is required to define the destination tree, and any cell inserted at the pivot D will arrive at all of the prescribed destinations. The combined source-destination tree is depicted in FIG. 9, completing the construction of the distribution tree. The structure of the distribution tree does not protect against interleaving of multiple cells sent from different sources. If, however, all messages sent on the tree are unicell messages, this problem does not arise.

The implementation of the utilization update mechanism is now clear. Suppose the intent is to have the utilization data be shared among all CPs. One can set up a distribution tree such that the source tree contains all CPs as sources and a destination tree that contains all CPs as destinations. When a node's CP notes that a change in the utilization of its links has taken place, it sends a utilization update message to the CPs of the other nodes in the network. Every utilization update emanating from a CP will be switched, as fast as the underlying switching mechanism allows, and will arrive at all other CPs.

To make sure the present invention works, one has to ensure that enough information can be conveyed within a unicell message. This can indeed be easily done, as will now be demonstrated with reference to the cell map diagram in FIG. 10.

Figure 5:
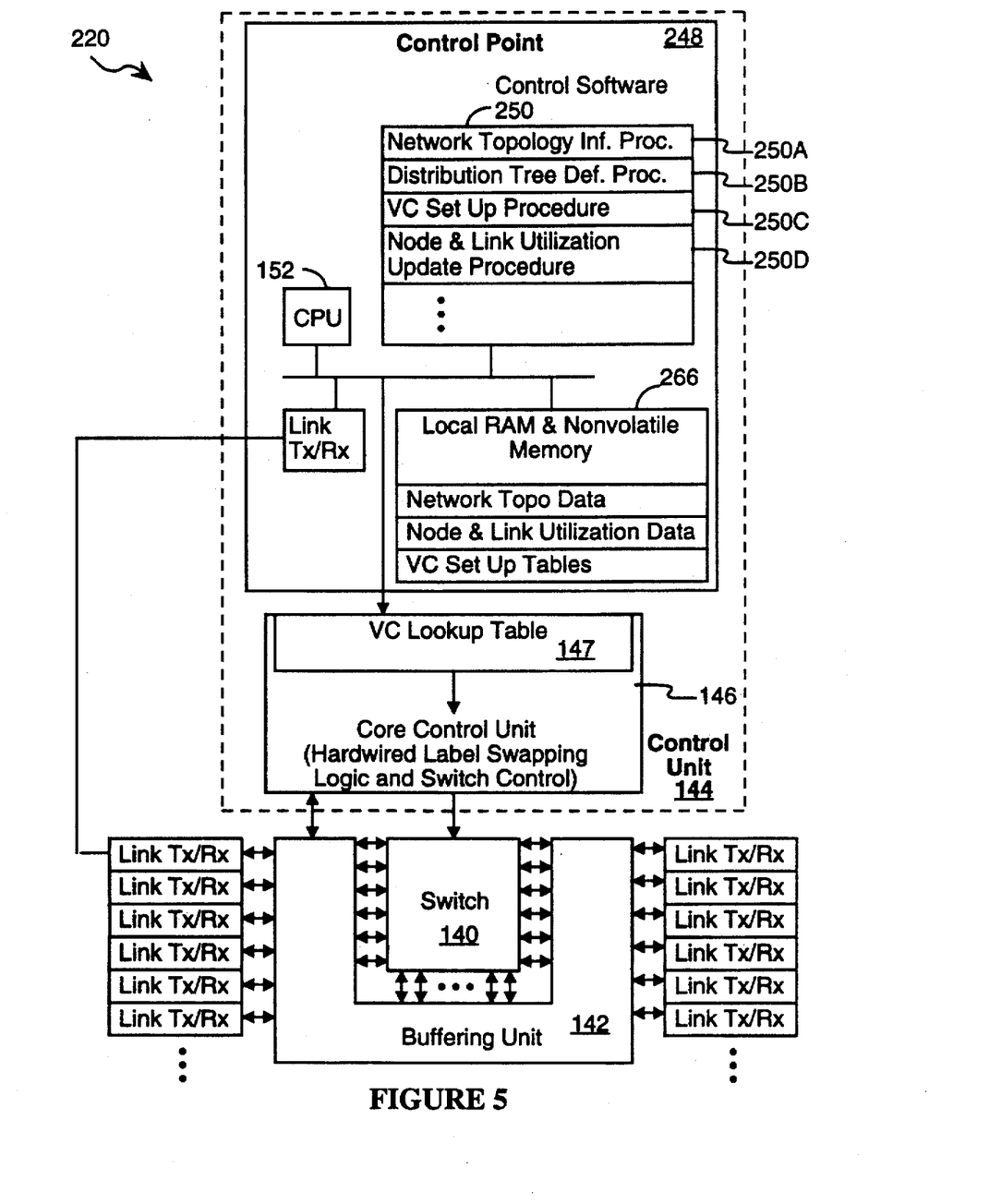
FIG. 5 is a block diagram of a node in an ATM network in accordance with the present invention.
Figure 10:
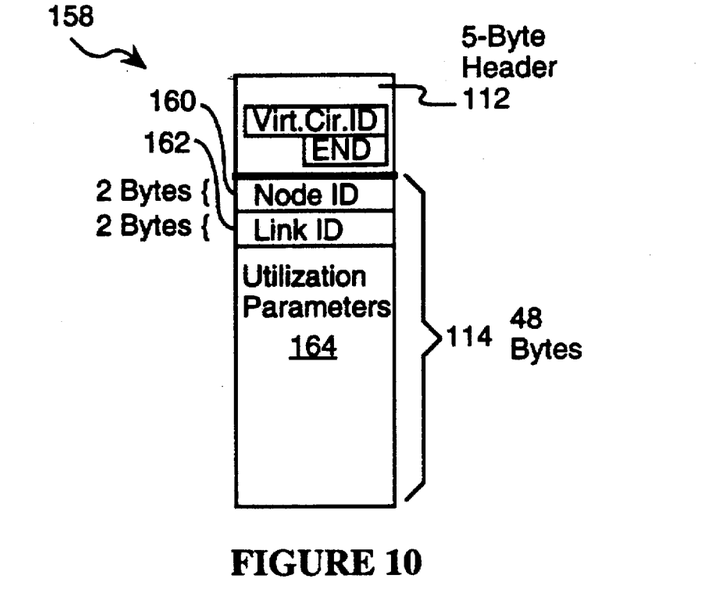
FIG. 10 depicts a unicell message for communicating network utilization data to a designated set of destination nodes.

Referring to FIGS. 5 and 10, in the preferred embodiment, the control processor 220 of each node of the ATM network of the present invention includes a node and link utilization update procedure 250D for sending and receiving utilization update messages 158. A utilization update refers to the utilization of nodes and/or links. For example, in a network with up to sixteen thousand nodes each node can be uniquely identified using two data bytes 160. If each node has up to sixteen thousand links emanating from it one could uniquely identify any link with four data bytes (i.e., a two byte node ID 160 and a two byte link ID 162). This identification is directional, that is, the two directions of the link have distinct identifiers. With such an encoding one can utilize the other 44 bytes of an ATM cell to encode various link and/or node utilization parameters 164.

VC set up procedure 250C is used for setting up ordinary virtual connections between nodes as well as for setting up the distribution tree of the present invention after the distribution tree has been defined. The VC set up procedure 250C takes into account node and link utilization data stored in the control point's local memory 266 in order to select a "lowest cost" route between two nodes in accordance with a predefined cost function that uses the utilization data to determine the associated "cost" of each potential route.

A Detailed Example Of A Pivot Based Distribution Tree

Figure 11:
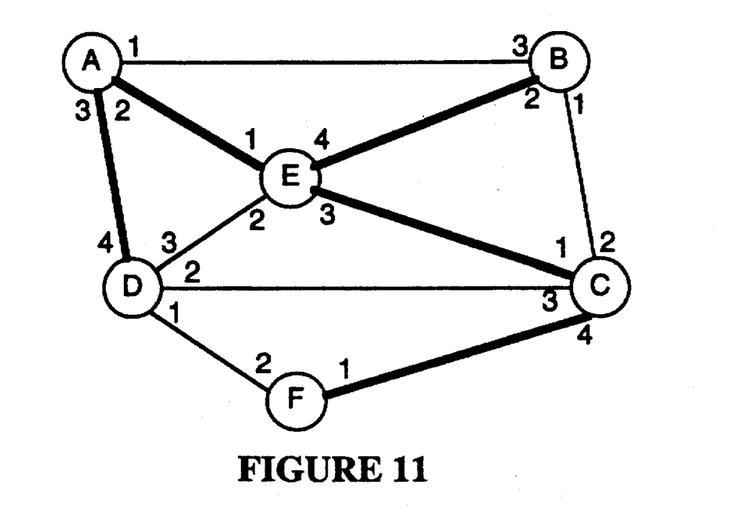
FIG. 11 depicts a distribution tree in small, exemplary ATM network.

For a utilization update where all nodes of the networks are involved, the entire set of nodes are both sources and destinations. In such a case it may be useful (though not necessary) to construct a single tree that serves as both the source and destination trees. FIG. 11 shows an example of such a network. In the example the circles are nodes whose names are marked with upper-case letters, the bold lines are the links of the designated tree and the port numbers are marked with numerals. Note that the assignment of port numbers is done locally and arbitrarily. By convention the local CP is always designated as port 0 (not shown in FIG. 11 ). Node E is the pivot in this example.

Consider the following excerpts of the switching tables (also herein called routing tables) in the switches. In every table there appears an input port ($P_i$) and an input VC identifier ($VCI_i$) as well as one or more pairs of output port ($P_o$) and output VC identifier ($VCI_o$). A cell arriving at an input port with a certain VCI is switched to the associated output port with the associated VCI. If multiple output designations appear the cell is switched on all the designated output ports each with its own (possible different) output VCI. Note that the VC tables shown here use abstract notations for explanation purposes; the specific implementation of the VC tables is switch dependent.

TABLE 1A

VC Table of Node A

| Input Designation | | Output Designation | | | |
|---|---|---|---|---|---|
| P | VCI | P | VCI | P | VCI |
| 0 | 25 | 2 | 23 | — | — |
| 3 | 18 | 2 | 23 | — | — |
| 2 | 21 | 3 | 24 | 0 | 24 |

TABLE 1B

VC Table of Node B

| Input Designation | | Output Designation | |
|---|---|---|---|
| P | VCI | P | VCI |
| 0 | 20 | 2 | 27 |
| 2 | 23 | 0 | 20 |

TABLE 1C

VC Table of Node C

| Input Designation | | Output Designation | | | |
|---|---|---|---|---|---|
| P | VCI | P | VCI | P | VCI |
| 0 | 13 | 1 | 30 | — | — |
| 4 | 31 | 1 | 30 | — | — |
| 1 | 22 | 0 | 18 | 4 | 18 |

TABLE 1D

VC Table of Node D

| Input Designation | | Output Designation | |
|---|---|---|---|
| P | VCI | P | VCI |
| 0 | 20 | 4 | 18 |
| 4 | 24 | 0 | 11 |

TABLE 1E

VC Table of Node E (the pivot node)

| Input Designation | | Output Designation | | | | | | | |
|---|---|---|---|---|---|---|---|---|---|
| P | VCI | P | VCI | P | VCI | P | VCI | P | VCI |
| 0 | 19 | 1 | 21 | 3 | 22 | 4 | 23 | — | — |
| 3 | 30 | 1 | 21 | 3 | 22 | 4 | 23 | 0 | 12 |
| 4 | 27 | 1 | 21 | 3 | 22 | 4 | 23 | 0 | 12 |
| 1 | 23 | 1 | 21 | 3 | 22 | 4 | 23 | 0 | 12 |

TABLE 1F

VC Table of Node F

| Input Designation | | Output Designation | |
|---|---|---|---|
| P | VCI | P | VCI |
| 0 | 31 | 1 | 31 |
| 1 | 18 | 0 | 12 |

Based on the exemplary VC tables (Tables 1A–1F) for the pivot based embodiment of the present invention, the following is the signal path of a cell from the CP of node F.

Step 1: The initial signal is a cell with a VCI of 31 and is received from node F's CP on node F's port 0. Node F reroutes the cell onto port 1 with a new header denoting a VCI of 31.

Step 2: The cell is then received on port 4 of node C (see FIG. 11), which reroutes the cell onto port 1 of node C with a VCI of 30.

Step 3: The cell is then received on port 3 of node E, which transmits (i.e., multicasts) the cell through ports 1, 3, 4 and 0 with VCI values of 21, 22, 23 and 12, respectively. The port 0 transmission sends a copy of the cell to Node E's CP; the port 1 transmission sends a copy of the cell to port 2 of node A; the port 3 transmission sends a copy of the cell to port 1 of node C, and the port 4 transmission sends a copy of the cell to port 2 of node B.

Step 4: At node A the cell is received on port 2 with a VCI of 21, and node A retransmits the cell on port 3 with a VCI of 24 to node D and on port 0 to node A's CP. At node B the cell is received on port 2 with a VCI of 23, and it rerouted through port 0 to node B's CP with a VCI of 20. At node C the cell is received on port 1 with a VCI of 22, and node C retransmits the cell on port 4 with a VCI of 18 to node F and on port 0 to node C's CP.

Step 5: At node D the cell is received on port 4 with a VCI of 24 and is rerouted through port 0 to node D's CP with a VCI of 11. At node F the cell is received on port 1 with a VCI of 18 and is rerouted through port 0 to node F's CP with a VCI of 12.

Similarly, inspection of the pivot based VC table segments indicates that a cell injected by the CP of node D (on port 0) with a VCI of 20 will be switched out on port 4 with a VCI 18. This cell will arrive at node A on port 3 and hence will be switched out on port 2 with VCI 23. This cell will then arrive at node E (the pivot) on port 1 and will be switched out on port 1 (towards node A) with a VCI 21, on port 4 (towards node B) with a VCI 23, on port 3 (towards node C) with a VCI 22 and of course also to port 0 (node E's own CP). Further routing of these cells according to the VC table segments shows that copies of the initial cell will be transmitted to all CPs in the network.

Thus, transmission of a cell by any node's CP with the appropriate initial VCI will result in the cell being transmitted to all other CPs in the network.

In an alternate embodiment of the pivot approach, the first step (181) of the distribution tree definition procedure is to select one or more pivot nodes. The second step is to define for each source host a sequence of connected nodes and output links that couple the source host to one of the pivot nodes, and a corresponding sequence of input labels to be stored in a message sent by the source host as the message is forwarded by the sequence of connected nodes to its corresponding one pivot node. Each sequence of input labels includes an associated first input label to be stored in a message when it is initially transmitted by the corresponding source host.

The third step (183) is to define for each pivot node a destination tree of nodes and output links that couple the pivot node to all of the destination hosts, and a corresponding set of input labels to be stored in a message sent by the pivot node as the message is forwarded by the tree of connected nodes to all of the destination hosts. Thus, when more than one pivot node is used, multiple destination trees are defined. Also assigned in step 183 are output labels to be stored in messages sent to the destination hosts by the nodes connected to the destination hosts. Steps 186 and 188, for programming the switching apparatus in the nodes in each sequence of connected nodes and in each destination tree in accordance with the defined sequences and sets of input labels remains substantially unchanged from what was described above. Also, as before, all overlapping virtual connections defined by this procedure reuse the same VCIs so as to minimize the number of VC table entries required to implement the present invention.

Second Preferred Embodiment: No-Pivot Approach

In the approach explained in the previous section of this document, the traffic load on the links is not completely balanced. For instance, in the example above if node C transmits a cell it will wind its way to node E (the pivot) and back towards node F thus traversing the link CE twice, once in each direction. This happens for every link shared by the source and the destination trees, but not for the links of the destination tree that are not shared by the source tree for a particular transmission. It is possible to construct a distribution tree without any pivot, thereby balancing the traffic on the distribution tree.

The main difference between the pivot based and the non-pivot based approaches is the manner in which the destination tree is constructed. In the second preferred embodiment, two VCs are defined between any two neighboring nodes of the destination tree, one in each direction. Each node must associate (i.e., link via its VC table) every incoming VC of the destination tree to all the outgoing VCs on the links of the destination tree except in the return direction (i.e., excluding the link of the incoming VC). In essence, the structure of the VC table in every node will be as if that node is the pivot in the pivot-based approach.

The sources in the non-pivot approach need not be connected in a tree. In general, they can form a forest where each tree of the forest connects several source hosts to one node on the destination tree that serves as the pivot for this tree.

Of course, if the set of source hosts is a subset of the set of destination hosts, the construct becomes much simpler as there is no need at all to construct the input forest. A detailed example is given below.

A Detailed Example Of A No-Pivot Based Distribution Tree

As an example consider again the network of FIG. 11. The VC tables of all the nodes appear in Tables 2A–2F. For example, a cell injected to the network at node C (port 0) is switched to both port 4 (towards node D) and port 1 (towards node E) with a VCI of 30. This cell, upon arrival at node E (on port 3) with that VCI will be forwarded appropriately towards nodes A and B and towards node's E own CP. As is evident from this example, every cell that traverses the non-pivot distribution tree will traverse every link exactly once, thereby balancing the load on the links of the tree. It is also evident from the examples that the number of VCs needed in both approaches is the same, except that the non-pivot approach makes even more use of multicast capabilities than the pivot approach.

TABLE 2A

VC Table of Node A

| Input Designation | | Output Designation | | | |
|---|---|---|---|---|---|
| P | VCl | P | VCl | P | VCl |
| 0 | 25 | 2 | 23 | 3 | 24 |
| 3 | 18 | 2 | 23 | 0 | 24 |
| 2 | 21 | 3 | 24 | 0 | 24 |

TABLE 2B

VC Table of Node B

| Input Designation | | Output Designation | |
|---|---|---|---|
| P | VCl | P | VCl |
| 0 | 20 | 2 | 27 |
| 2 | 23 | 0 | 20 |

TABLE 2C

VC Table of Node C

| Input Designation | | Output Designation | | | |
|---|---|---|---|---|---|
| P | VCl | P | VCl | P | VCl |
| 0 | 13 | 1 | 30 | 4 | 18 |
| 4 | 31 | 1 | 30 | 0 | 18 |
| 1 | 22 | 0 | 18 | 4 | 18 |

TABLE 2D

VC Table of Node D

| Input Designation | | Output Designation | |
|---|---|---|---|
| P | VCl | P | VCl |
| 0 | 20 | 4 | 18 |
| 4 | 24 | 0 | 11 |

TABLE 2E

VC Table of Node E

| Input Designation | | Output Designation | | | | | |
|---|---|---|---|---|---|---|---|
| P | VCl | P | VCl | P | VCl | P | VCl |
| 0 | 19 | 1 | 21 | 3 | 22 | 4 | 23 |
| 3 | 30 | 1 | 21 | 0 | 12 | 4 | 23 |
| 4 | 27 | 1 | 21 | 3 | 22 | 0 | 12 |
| 1 | 23 | 0 | 12 | 3 | 22 | 4 | 23 |

TABLE 2F

VC Table of Node F

| Input Designation | | Output Designation | |
|---|---|---|---|
| P | VCl | P | VCl |
| 0 | 31 | 1 | 31 |
| 1 | 18 | 0 | 12 |

Distribution Tree Set Up

A tree is a connected subgraph that contains no cycles. In a typical graph there are many possible trees that span (i.e., connect) the same set of nodes. A spanning tree is a tree that connects all the nodes in a graph. The use of distribution trees to disseminate information raises several related technical questions. How are trees selected, and what are the advantages of selecting a certain tree? How are connections, and in particular distribution trees, set up and programmed into the switch tables?

There are various ways described in the literature to select trees which are optimized under various criteria. For instance, there are centralized and distributed tree selection approaches described in the literature and that are well known to those skilled in the art.

Distributed tree computation techniques known to those skilled in the art are described in the following publications: 1) I. Cidon, I. Gopal, M. Kaplan and S. Kutten, "A distributed Control Architecture of High-Speed Networks," IEEE Trans. on Communications, Vol. 43, No. 1, January 1995; 2) B. Awerbuch, I. Cidon and S. Kutten, "Communication-Optimal Maintenance of Replicated Information," Proceedings of 31 st Ann. Symposium on Foundation of Computer Science (St. Louis, Mo.), October 1990, pp. 492–502; and 3) D. Bertsekas and R. Gallager, "Data Networks," second edition, Prentice Hall, 1992. The Cidon article is hereby incorporated by reference.

In the preferred embodiment, a centralized distribution tree selection and definition procedure 250B (see FIG. 5) is used, as will be described next.

In ATM networks, certain nodes in the network maintain information regarding the topology of the network gathered through a topology information exchange mechanism or network management system. Each such node stores a representation of the network's topography in its local memory 266, where the representation is a graph whose nodes and links correspond to the actual and communication nodes and links in the network. Each link is assigned a weight which is a number that represents its cost (in dollars), its relative quality (the lower the weight the better the quality) or its reliability. When the distribution tree of the present invention spans all the nodes in the network, we may try to select the distribution tree in such a way that the sums of the weights of the selected tree will be minimized. A well known graph problem is to compute a minimum weight spanning tree (known as the MST problem). This is one version of a "cost function minimization" methodology for selecting and defining a distribution tree. There are various efficient algorithms to solve the MST problem, some of which are described in D. Bertsekas and R. Gallager, "Data Networks," second edition, Prentice Hall, 1992. When the graph needs to span only a subset of the nodes the problem of finding a minimum weight tree is termed a Steiner tree problem. While no efficient algorithm is known for solving this problem, there are various efficient techniques to approximate it. The best Steiner tree approximation will result in a tree whose weight is no more than twice the optimal one. There are other criterion to select a "good" tree such as a minimum radius tree.

Distribution Tree Set Up

Referring to FIG. 6, applying the above to the present invention, when using the pivot version of the present invention, the distribution tree is computed by (A) selecting a pivot node (180), (B) computing a minimum weight spanning or Steiner tree for the source tree (181), depending on whether all the nodes or just a subset are to be message sources, and (C) computing a minimum weight spanning or Steiner tree for the destination tree (182). Virtual connections for linking the source and destination trees are also defined (183).

When using the non-pivot version of the present invention, the distribution tree formation process begins by constructing a tree of nodes and bidirectional links that interconnect all the source hosts to all the destination hosts (184). The defined distribution tree is an acyclic graph, which by definition does not include any loops. A single input label is assigned for each communication node input link traversed by the defined tree, and a single output label is also assigned for each communication node output link traversed by the tree. Next, virtual connection table entries for the switching apparatus of each communication node in the tree are defined so that each such node will send each message received by the communication node on an input link, where the message includes the input label assigned to the receiving input link, to all of the output links of the receiving communication node to which an output label has been assigned except the output link to the node or host from which the message was received (185).

Steps 184 and 195 set up a virtual connection for messages transmitted by each designated source host such that any message transmitted via any one of the virtual connections is routed along any link of the communication network no more than once. In essence, the structure of the VC table in every node will be as if that node is the pivot in the pivot-based approach.

In addition, overlapping portions of the non-pivot virtual connections are assigned identical labels, minimizing the total number of labels required by the virtual connections. Each such virtual connection can be considered a distribution tree. The number of VCIs needed for defining all the non-pivot distribution trees is quite small. In particular, the number of VCIs required by any one node in a system using the present invention cannot exceed n+1, where n is the number of nodes in the system, and the total number of VCIs needed by all the nodes in the distribution trees is equal to 3n−2 in a network of n nodes (that is less than three VCIs per node, on the average).

In both the pivot and non-pivot approaches, the computed distribution tree(s) must be stored in the VC tables of the nodes in the distribution tree(s) so that network utilization messages, or other information to be distributed to all the designated CPs, will be automatically routed. Various current networks support multicast along trees and provide signalling between nodes in order to set up any computed tree from the source host toward its leaves. In ATM networks a tree is typically set up by a VC set up procedure 250C (see FIG. 5) using set up messages. A set up message is a particular type of source route message. Referring to FIG. 6, the VC set up procedure 250C sends one or more VC set up messages, and those VC set up messages are routed through the ATM network such that they are received by the CPs of all the nodes in the connection to be established.

Thus, the distribution tree(s) defined by steps 180–183 or 184–185 are set up through the use of set up messages (186) generated by the VC set up procedure 250C. Tree set up can be performed by adding the branches of the tree one by one, and then using the branches of the tree that already exist to send the additional messages needed to complete construction of the distribution tree. Alternately, an entire tree, or an entire branch of a tree can be set up using a single set up message. A technique for setting up a tree using a single message which traverses the tree is described in I. Cidon, I. Gopal, M. Kaplan and S. Kutten, "A distributed Control Architecture of High-Speed Networks," IEEE Trans. on Communications, Vol. 43, No. 1, January 1995.

In both embodiments, virtual connection data corresponding to the distribution tree(s) is stored in the routing tables of all the communication nodes traversed by the distribution tree(s) (188).

In either case, after the virtual connection data has been stored in the distribution tree or trees, link and node utilization data is thereafter transmitted to all the designated destination nodes simply by sending a unicell message from any of the source hosts onto the virtual connection that defines the distribution tree or trees (190). The message is then automatically and efficiently routed to the CPs of all the designated destination nodes by the standard routing mechanisms of the ATM nodes in the network.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of sending multicast messages in a switch based label swapping communication network of hosts and communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said method comprising the steps of:

designating a set of source hosts and a set of destination hosts,in said network;

designating at least one of said nodes in said communication network as a pivot node;

defining for each source host a sequence of connected nodes and output links that couple the source host to one of the pivot nodes, and a corresponding sequence of input labels to be stored in a multicast message sent by said source host as the multicast message is forwarded by the sequence of connected nodes to the one pivot node; each said sequence of input labels including an associated first input label to be stored in the multicast when it is initially transmitted by the corresponding source host;

defining for each pivot node a single destination tree of nodes and output links that couple the pivot node to all of said destination hosts, and a corresponding set of input labels to be stored in a multicast message sent by said pivot node as the multicast message is forwarded by the tree of connected nodes to all of said destination hosts;

assigning output labels to be stored in messages sent to said destination hosts by the nodes in said destination tree that are connected to said destination hosts by said output links in said destination tree; and programming the switching apparatus in said nodes in each said sequence of connected nodes and in each said destination tree in accordance with said defined sequences and sets of input labels;

wherein at least a plurality of source hosts are coupled to a single one of the pivot nodes such that multicast messages from the plurality of source hosts are all transmitted via a same destination tree of nodes to all the destination hosts; and wherein said defining and programming steps set up a virtual connection for multicast messages transmitted by each designated source host and overlapping portions of said virtual connections are assigned identical labels, minimizing the total number of labels required by said virtual connections.

2. The method of claim 1, including transmitting multicast messages from the source hosts to all of said destination hosts via said communication nodes, each multicast message when initially transmitted by one of said source hosts having one of said associated first input labels stored therein;

wherein each communication node has a control processor that can send and receive messages via said communication node's switching apparatus, and a plurality of said source hosts and destination hosts are ones of said communication node control processors.

3. A method of sending messages in a switch based label swapping communication network of hosts and communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said method comprising the steps of:

designating a set of source hosts and a set of destination hosts in said network;

selecting a single tree of said communication nodes and bidirectional links interconnecting all of said designated source hosts and destination hosts, including assigning a single input label for each communication node input link traversed by said tree, and assigning a single output label for each communication node output link traversed by said tree;

programming the switching apparatus of each communication node in said tree to send each multicast message received by said communication node on an input link, where said multicast message includes said input label assigned to said receiving input link, to all of said output links of the receiving communication node to which an output label has been assigned except the output link to the node or host from which the multicast message was received;

whereby said defining and programming steps set up a virtual connection for multicast messages transmitted by each designated source host such that any multicast message transmitted via any one of said virtual connections is routed along any link of said communication network no more than once, and overlapping portions of said virtual connections are assigned identical labels, minimizing the total number of labels required by said virtual connections.

4. The method of claim 3, wherein each communication node has a control processor that can send and receive messages via said communication node's switching apparatus, and a plurality of said source hosts and destination hosts are ones of said communication node control processors.

5. A method of sending multicast messages in a switch based label swapping communication network of hosts and communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said method comprising the steps of:

designating a set of source hosts and a set of destination hosts in said network;

designating at least one of said nodes in said communication network as a pivot node;

defining a set of virtual connections including a virtual connection from each designated source host to all of said designated destination hosts, and message labels for all multicast messages sent by the source hosts to be routed to said designated destination nodes, said virtual connections for conveying each multicast message from the designated source hosts having said defined message labels to all the designated destination hosts as a single multicast message; said defining step including defining said message labels so that overlapping portions of said virtual connections use the same message labels;

sending a set up message to all communication nodes traversed by said virtual connections, instructing those communication nodes to store label swapping data corresponding to said defined virtual connections and said defined message labels;

transmitting multicast messages from said source hosts to all of said destination hosts via said communication nodes, each multicast message when initially transmitted by one of said source hosts having one of said defined message labels stored therein;

wherein at least a plurality of source hosts are coupled to a single one of the pivot nodes such that multicast messages from the plurality of source hosts are all transmitted via a same set of virtual connections from the one pivot node to all the destination hosts.

6. The method of claim 5, wherein each communication node has a control processor that can send and receive messages via said communication node's switching apparatus, and a plurality of said source hosts and destination hosts are ones of said communication node control processors.

7. The method of claim 5, wherein said defining step includes selecting one of said communication nodes as a pivot node, defining a source tree with said pivot node as its root that connects all of said designated source hosts to said pivot node, defining a destination tree with said pivot node as its root that connects said pivot node to all of said designated destination hosts, and defining each of said virtual connections to traverse a corresponding portion of said source tree and all of said destination tree.

8. A switch based label swapping communication network, comprising:

a set of interconnected hosts and switch based label swapping communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

at least one of said hosts including a distribution tree set up procedure, executed by said at least one host, that stores source/destination data designating a set of source hosts and a set of destination hosts in said communication network;

designates at least one of said nodes in said communication network as a pivot node;

defines for each source host a sequence of connected nodes and output links that couple the source host to one of the pivot nodes, and a corresponding sequence of input labels to be stored in a multicast message sent by said source host as the multicast message is forwarded by the sequence of connected nodes to the one pivot node; each said sequence of input labels including an associated first input label to be stored in the multicast message when it is initially transmitted by the corresponding source host;

defines for each pivot node a destination tree of nodes and output links that couple the pivot node to all of said destination hosts, and a corresponding set of input labels to be stored in a multicast message sent by said pivot node as the multicast message is forwarded by the tree of connected nodes to all of said destination hosts;

assigns output labels to be stored in multicast messages sent to said destination hosts by the nodes in said destination tree that are connected to said destination hosts by said output links in said destination tree; and programs the switching apparatus in said nodes in each said sequence of connected nodes and in each said destination tree in accordance with said defined sequences and sets of input labels; and each of said designated source hosts including message transmission apparatus that transmits multicast messages to all of said destination hosts via said nodes, each said message when initially transmitted by one of said source hosts having one of said associated first input labels stored therein;

wherein at least a plurality of source hosts are coupled to a single one of the pivot nodes such that multicast messages from the plurality of source hosts are all transmitted via a same destination tree of nodes to all the destination hosts; and wherein said distribution tree set up procedure sets up a virtual connection for multicast messages transmitted by each designated source host and overlapping portions of said virtual connections are assigned identical labels, minimizing the total number of labels required by said virtual connections.

9. The network set forth in claim 8, wherein each communication node has a control processor that can send and receive messages via said communication node's switching apparatus, and a plurality of said source hosts and destination hosts are ones of said communication node control processors.

10. A switch based label swapping communication network, comprising:

a set of interconnected hosts and switch based label swapping communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

at least one of said hosts including a distribution tree set up procedure, executed by said at least one host, that stores source/destination data designating a set of source hosts and a set of destination hosts in said communication network;

selects a tree of said communication nodes and bidirectional links interconnecting all of said designated source hosts and destination hosts, including assigning a single input label for each communication node input link traversed by said tree, and assigning a single output label for each communication node output link traversed by said tree; and programs the switching apparatus of each communication node in said tree to send each multicast message received by said communication node on an input link, where said multicast message includes said input label assigned to said receiving input link, to all of said output links of the receiving communication node to which an output label has been assigned except the output link to the node or host from which the multicast message was received; and each of said designated source hosts including message transmission apparatus that transmits multicast messages that include said input label assigned to one of said input links that connects said designated source host to one of said communication nodes in said tree; and wherein said distribution tree set up procedure sets up a virtual connection for multicast messages transmitted by each designated source host and overlapping portions of said virtual connections are assigned identical labels, minimizing the total number of labels required by said virtual connections.

11. The network set forth in claim 10, wherein each communication node has a control processor that can send and receive messages via said communication node's switching apparatus, and a plurality of said source hosts and destination hosts are ones of said communication node control processors.

12. A switch based label swapping communication network, comprising:

a set of interconnected hosts and switch based label swapping communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

at least one of said hosts including a distribution tree set up procedure, executed by said at least one host, that stores source/destination data designating a set of source hosts and a set of destination hosts in said communication network;

designates at least one of said nodes in said communication network as a pivot node;

defines a set of virtual connections including a virtual connection from each designated source host to all of said designated destination hosts, and message labels for all multicast messages sent by the source hosts to be routed to said designated destination nodes, said virtual connections for conveying each multicast message from the designated source hosts having said defined message labels to all the designated destination hosts as a single multicast message; said defining step including defining said message labels so that overlapping portions of said virtual connections use the same message labels;

programs the switching apparatus in all communication nodes traversed by said virtual connections, instructing those communication nodes to store label swapping data corresponding to said defined virtual connections and said defined message labels;

each of said designated source hosts including message transmission apparatus that transmits multicast messages to all of said destination hosts via said communication nodes, each said multicast message when initially transmitted by one of said source hosts having one of said defined message labels stored therein;

wherein at least a plurality of source hosts are coupled to a single one of the pivot nodes such that multicast messages from the plurality of source hosts are all transmitted via a same set of virtual connections from the one pivot node to all the destination hosts.

13. The network set forth in claim 12, wherein each communication node has a control processor that can send and receive messages via said communication node's switching apparatus, and a plurality of said source hosts and destination hosts are ones of said communication node control processors.

14. The network set forth in claim 12, wherein said distribution tree set up procedure selects one of said communication nodes as a pivot node, defines a source tree that connects all of said designated source hosts to said pivot node, defines a destination tree that connects said pivot node to all of said designated destination hosts, and defines each of said virtual connections to traverse a corresponding portion of said source tree and all of said destination tree.

* * * * *